US010785518B2

(12) United States Patent
Onoda et al.

(10) Patent No.: US 10,785,518 B2
(45) Date of Patent: Sep. 22, 2020

(54) VIDEO MANAGEMENT SYSTEM, VIDEO MANAGEMENT METHOD, AND RECORDING MEDIUM

(71) Applicant: JVC KENWOOD Corporation, Yokohama-shi, Kanagawa (JP)

(72) Inventors: Hideaki Onoda, Yokohama (JP); Jiro Uzaki, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 111 days.

(21) Appl. No.: 16/103,951

(22) Filed: Aug. 15, 2018

(65) Prior Publication Data
US 2019/0069002 A1 Feb. 28, 2019

(30) Foreign Application Priority Data

Aug. 24, 2017 (JP) .............................. 2017-161333

(51) Int. Cl.
*H04N 21/239* (2011.01)
*H04N 21/234* (2011.01)
(Continued)

(52) U.S. Cl.
CPC ....... *H04N 21/2396* (2013.01); *H04N 21/235* (2013.01); *H04N 21/23418* (2013.01);
(Continued)

(58) Field of Classification Search
CPC ........... H04N 21/2396; H04N 21/4788; H04N 21/235; H04N 21/25891; H04N 21/8133; H04N 21/437; H04N 21/4784; H04N 21/4781; H04N 21/23418; H04N 21/4627; H04N 21/4508; H04N 21/4312; H04N 21/25866; H04N 21/25816; H04N 21/2541; H04N 21/2393; G06F 21/6218; G06F 21/604

See application file for complete search history.

(56) References Cited

U.S. PATENT DOCUMENTS

| 2011/0137854 | A1* | 6/2011 | Walter .................. H04L 67/104 707/608 |
| 2016/0105634 | A1* | 4/2016 | Marchese ................ H04N 5/91 386/241 |
| 2017/0064240 | A1* | 3/2017 | Mangat .............. H04N 21/4781 |

FOREIGN PATENT DOCUMENTS

JP 2006-332990 12/2006

* cited by examiner

*Primary Examiner* — Hai V Tran
(74) *Attorney, Agent, or Firm* — Amin, Turocy & Watson, LLP

(57) ABSTRACT

A server of a video management system includes a control unit that, upon receiving the video transmission request and the affiliation information transmitted from the terminal, determines whether the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group, the control unit transmitting the match video data to the terminal in the first case.

6 Claims, 8 Drawing Sheets

(51) Int. Cl.
*H04N 21/478* (2011.01)
*H04N 21/4784* (2011.01)
*H04N 21/437* (2011.01)
*H04N 21/81* (2011.01)
*H04N 21/258* (2011.01)
*H04N 21/235* (2011.01)
*H04N 21/4788* (2011.01)

(52) U.S. Cl.
CPC ..... *H04N 21/25891* (2013.01); *H04N 21/437* (2013.01); *H04N 21/4781* (2013.01); *H04N 21/4784* (2013.01); *H04N 21/4788* (2013.01); *H04N 21/8133* (2013.01)

FIG.2

| | BATTER SCORE INFORMATION (51a) | | | | | | | RUNNER SCORE INFORMATION (51b) | | | TAG INFORMATION (51c) |
|---|---|---|---|---|---|---|---|---|---|---|---|
| PITCH ID | AT-BAT ID | IN-NING | ▲/▼ | BATTING ORDER | PERSONAL ID | PITCHING RESULT INFORMATION | ON-BASE INFORMATION | 1ST BASE RUNNER (PERSONAL ID) | 2ND BASE RUNNER (PERSONAL ID) | 3RD BASE RUNNER (PERSONAL ID) | TAG INFORMATION |
| A085 | D005 | 8 | ▼ | 5 | 005 | BALL | | A () | — () | — () | TA0085 |
| A086 | D005 | 8 | ▼ | 5 | 005 | SWING | | — () | — () | — () | TA0086 |
| A087 | D005 | 8 | ▼ | 5 | 005 | STRIKE | | — () | — () | — () | TA0087 |
| A088 | D005 | 8 | ▼ | 5 | 005 | SINGLE | 1 | — () | — () | — () | TA0088 |
| A089 | D006 | 8 | ▼ | 6 | 006 | BALL | | — (005) | — () | — () | TA0089 |
| A090 | D006 | 8 | ▼ | 6 | 006 | FOUL | | — (005) | — () | — () | TA0090 |
| A091 | D006 | 8 | ▼ | 6 | 006 | SINGLE | 1 | 2ND BASE (005) | — () | — () | TA0091 |
| A092 | D007 | 8 | ▼ | 7 | 007 | SINGLE | 1 | 2ND BASE (006) | 3RD BASE (005) | — () | TA0092 |
| A093 | D008 | 8 | ▼ | 8 | 008 | FOUL | | — (007) | — (006) | — (005) | TA0093 |
| A094 | D008 | 8 | ▼ | 8 | 008 | STRIKE | | — (007) | — (006) | — (005) | TA0094 |
| A095 | D008 | 8 | ▼ | 8 | 008 | STRIKE-OUT | 0 | — (007) | — (006) | — (005) | TA0095 |
| A096 | D009 | 8 | ▼ | 9 | 009 | SWING | | — (007) | — (006) | — (005) | TA0096 |
| A097 | D009 | 8 | ▼ | 9 | 009 | STRIKE | | — (007) | — (006) | — (005) | TA0097 |
| A098 | D009 | 8 | ▼ | 9 | 009 | SINGLE | 1 | 2ND BASE (007) | 3RD BASE (006) | HOME (005) | TA0098 |
| A099 | D010 | 8 | ▼ | 1 | 001 | GROUNDER TO 2ND | 0 | — (009) | — (007) | — (006) | TA0099 |
| A100 | D011 | 8 | ▼ | 2 | 002 | FLY OUT TO RIGHT FIELD | 0 | — (009) | — (007) | — (006) | TA0100 |

FIG.3

| TITLE | AFFILIATION | TIME | POINT | SYNC |
|---|---|---|---|---|
| VIDEO 01 | T11 | t1 | P1 | S1 |
| VIDEO 02 | – | t2 | – | S2 |
| VIDEO 03 | T22 | t3 | P3 | S3 |
| ⋮ | ⋮ | ⋮ | ⋮ | ⋮ |

FIG.4

| TAG INFORMATION | TIME INFORMATION |
|---|---|
| TA0085 | 10:03:05 |
| TA0086 | 10:03:21 |
| TA0087 | 10:03:55 |
| ⋮ | ⋮ |
| TA0092 | 10:08:12 |
| TA0093 | 10:09:25 |
| ⋮ | ⋮ |

FIG.5

| GROUP NAME (54a) | AFFILIATION TEAM (54b) |
|---|---|
| GROUP G1 | T11, T12, T13, T14, ··· |
| GROUP G2 | T21, T22, T23, T24, ··· |
| ⋮ | ⋮ |

| TEAM NAME (55a) | AFFILIATION GROUP (55b) | POSSESSING POINT (55c) | |
|---|---|---|---|
| T11 | G1 | P11 | |
| T12 | G1 | P12 | |
| T13 | G1 | P13 | |
| ⋮ | ⋮ | ⋮ | |

55

| PERSONAL ID (56a) | AFFILIATION TEAM (56b) | AFFILIATION GROUP (56c) | |
|---|---|---|---|
| PERSONAL 01 | T21 | G2 | |
| PERSONAL 02 | T14 | G1 | |
| ⋮ | ⋮ | ⋮ | |

| TEAM NAME (55a) | AFFILIATION GROUP (55b) | POSSESSING POINT (55c) | |
|---|---|---|---|
| T11 | G1 | P11−$\alpha$ | |
| T12 | G1 | P12 | |
| T13 | G1 | P13 | |
| ⋮ | ⋮ | ⋮ | |

| TEAM NAME (55a) | AFFILIATION GROUP (55b) | POSSESSING POINT (55c) | |
|---|---|---|---|
| T11 | G1 | P11−$\alpha$ | |
| T12 | G1 | P12+$\beta$ | |
| T13 | G1 | P13 | |
| ⋮ | ⋮ | ⋮ | |

55

VIDEO MANAGEMENT SYSTEM, VIDEO MANAGEMENT METHOD, AND RECORDING MEDIUM

CROSS-REFERENCE TO RELATED APPLICATION(S)

The present application claims priority to and incorporates by reference the entire contents of Japanese Patent Application No. 2017-161333 filed in Japan on Aug. 24, 2017.

BACKGROUND

The present disclosure relates to a video management system, a video management method, and a recording medium.

When a match such as a sports event is held, a person may capture the video of the match, and after the match ends, a review meeting may be held and an advice may be given to players while watching the match video. Such a match video may be shared within a team to which the photographer belongs, for example. JP 2006-332990 A discloses a system that distributes a video captured by a person to limited viewers.

In the technique disclosed in JP 2006-332990 A, since only the limited viewers can watch the video, members of the other team cannot watch the video when members of a subject team are permitted to watch, for example. In contrast, there is a need to effectively utilize the match video by allowing members of the other team to watch the match video while suppressing the match video from being distributed to unlimited viewers.

SUMMARY

It is an object of the present disclosure to at least partially solve the problems in the conventional technology. A video management system according to one aspect includes a server that manages match video data obtained by capturing a match between teams belonging to the same group for respective groups, and a terminal configured to be able to transmit a video transmission request to transmit the match video data and affiliation information indicating the group and the team serving as an affiliation destination to the server and configured to be able to receive the match video data transmitted from the server. The match video data managed by the server includes affiliation video data belonging to a specific team, and the server includes a control unit that, upon receiving the video transmission request and the affiliation information transmitted from the terminal, determines whether the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group, the control unit transmitting the match video data to the terminal in the first case, transmitting the match video data to the terminal in the second case when a predetermined transmission condition for transmitting the match video data is satisfied, and rejecting transmission of the match video data in the third case or the second case when the transmission condition is not satisfied.

A video management method according to one aspect includes determining whether, when a server that manages match video data obtained by capturing a match between teams belonging to the same group for respective groups receives a video transmission request to transmit the match video data and affiliation information indicating the group and the team serving as an affiliation destination, transmitted from a terminal, the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group, and transmitting the match video data to the terminal in the first case, transmitting the match video data to the terminal in the second case when a predetermined transmission condition for transmitting the match video data is satisfied, and rejecting transmission of the match video data in the third case or the second case when the transmission condition is not satisfied.

A non-transitory computer readable recording medium storing therein a video management program according to one aspect causes a computer to execute determining whether, when a server that manages match video data obtained by capturing a match between teams belonging to the same group for respective groups receives a video transmission request to transmit the match video data and affiliation information indicating the group and the team serving as an affiliation destination, transmitted from a terminal, the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group, and transmitting the match video data to the terminal in the first case, transmitting the match video data to the terminal in the second case when a predetermined transmission condition for transmitting the match video data is satisfied, and rejecting transmission of the match video data in the third case or the second case when the transmission condition is not satisfied.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2 is a diagram illustrating an example of score data stored in a score data storing unit;

FIG. 3 is a diagram schematically illustrating an example of match video data stored in a video data storing unit;

FIG. 4 is a diagram illustrating an example of synchronization information stored in a video data storing unit;

FIG. 5 is a diagram illustrating an example of group data stored in a group data storing unit;

FIG. 6 is a diagram illustrating an example of team data stored in a team data storing unit;

FIG. 11 is a diagram illustrating an example of a case in which point information of team data changes; and FIG. 12 is a diagram illustrating another example of a case in which point information of team data changes.

DETAILED DESCRIPTION

Hereinafter, an embodiment of a video management system, a video management method, and a recording medium according to the present disclosure will be described with reference to the drawings. The present disclosure is not limited to the embodiment. Moreover, components of the embodiment below include components which can be easily replaced by those skilled in the art or components which are substantially the same as those of the embodiment.

Figure 1:
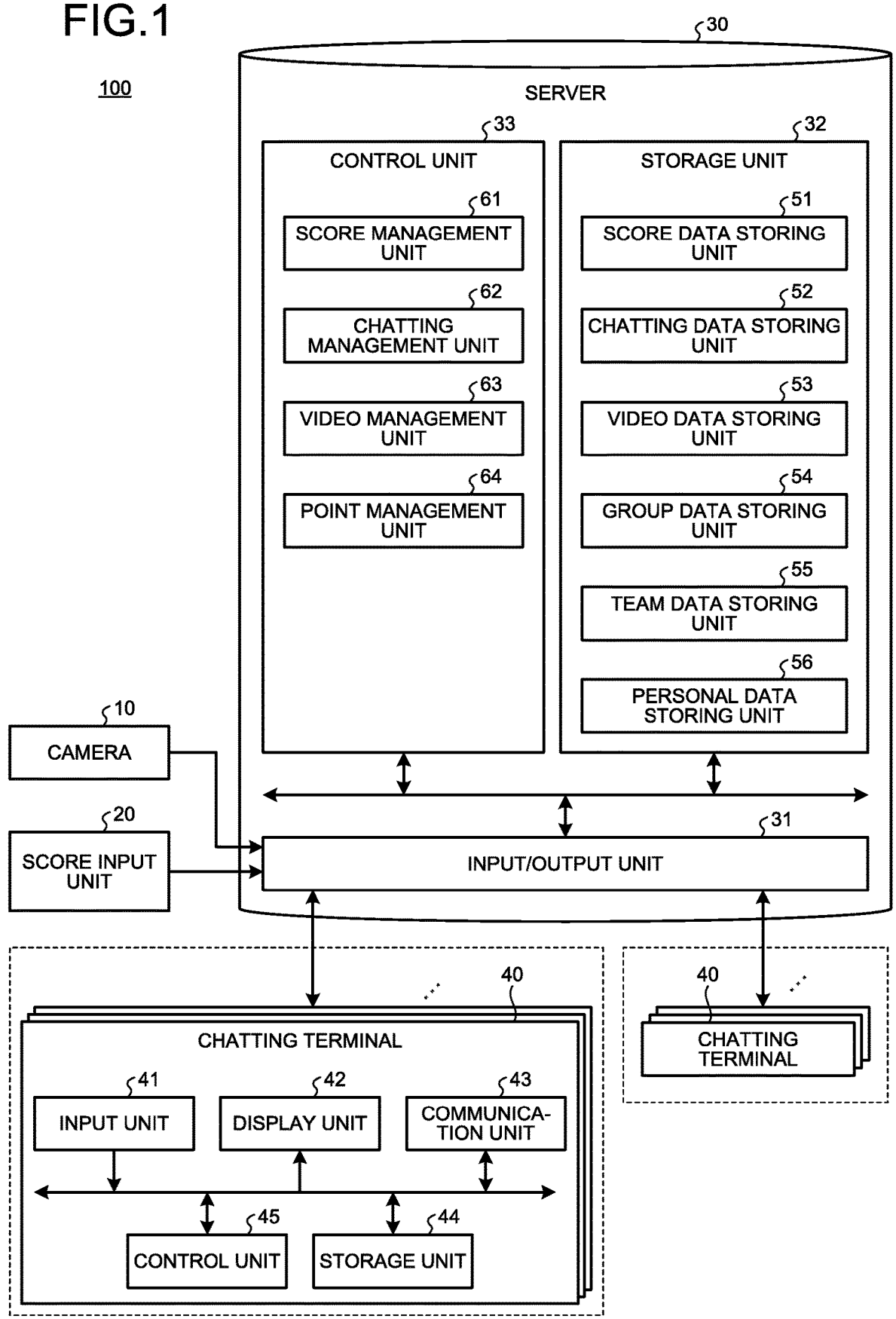
FIG. 1 is a block diagram illustrating an example of a video management system according to the present embodiment.

FIG. 1 is a block diagram illustrating an example of a video management system 100 according to the present embodiment. The video management system 100 illustrated in FIG. 1 is used when users watch a video of a match content and perform a chatting on a match content when teams play a match in a sports event such as a baseball, for example. The video management system 100 may not allow users to perform a chatting. In the following description, a case in which the video management system 100 allows users to watch a video and perform a chatting will be described as an example. By using this video management system 100, after the end of a match, a review meeting can be held and an advice can be given to players while watching the match video. Moreover, when this video management system 100 allows users to perform a chatting, the progress state of the match or the like may be informed of using a chatting so that a person who cannot participate in the match or cannot go to watch the match can understand the progress state of the match. Although a baseball is described as an example of a sports event, the sports event is not limited thereto, but the same description is true for other sports events such as football, volleyball, tennis, badminton, and the like. Moreover, the video management system 100 can be applied to competitions other than sports matches such as a dance contest (a dancing competition), a piano contest (a performance competition), a contest (a card game competition or a table game competition), or a karaoke contest (a singing contest).

As illustrated in FIG. 1, the video management system 100 includes a camera 10, a score input unit 20, a server 30, and a chatting terminal 40 as a terminal. The camera 10 captures the content of a match in a stadium, for example. The camera 10 may be provided solely or plurally. The capturing data obtained by the camera 10 is transmitted to the server 30 as a match video data and is managed in the server 30, for example.

In the present embodiment, a case in which a plurality of teams belongs to one group will be described as an example. In the present embodiment, match video data is video data obtained by capturing matches between teams belonging to the same group.

In the present embodiment, a case in which the camera 10 is prepared for respective teams will be described as an example. In this case, in one match, the match is captured by two cameras of the camera 10 of one team and the camera 10 of the other team. For example, the match video data captured by the camera 10 of one team belongs to the one team and is used for the one team to hold a review meeting and give an advice to players while watching the match video after the end of the match. Similarly, the match video data captured by the camera 10 of the other team belongs to the other team and is used for the other team to hold a review meeting and give an advice to players while watching the match video after the end of the match. Hereinafter, when the match video data belonging to the respective team is distinguished from other match video data, the match video data is sometimes referred to as affiliation video data.

The score input unit 20 inputs match progress data indicating the progress state of a match to the server 30. In the present embodiment, score data is an example of the match progress data indicating the progress state of a baseball. The score data is data that form scores described in a scorebook of a baseball and is individual events that form a series of events starting from the pitch of a pitcher. The score is a set of items of score data. Therefore, a plurality of items of score data is created whenever a pitcher pitches a ball. Accordingly, one score is created. For example, when a batting result is a fly out to right field in a state in which a runner is on the first base, and the first base runner is tagged out, score data indicating that the batter was out, score data indicating that the batter flied to the right field, and score data indicating that the first base runner was out are created, and one score is formed from these items of score data.

In addition to the above-mentioned items of score data, the score includes other items of score data such as an action of a batter, an action of a fielder, settlement of counts, an advance state of a runner when there is a runner on a base, and other actions of batters and fielders. Specifically, the score includes score data such as a strike, a ball, a foul, a batting result, a batting type, a catching fielder, and an advance result. The batting result is information such as an out, a single, a double, a triple, and a home run. The batting type is information such as a ground, a liner, a fly, a bunt and may be classified more finely. The catching fielder is information for specifying a fielder who actually caught a ball or the position of the fielder. The advance result is information on an advance of a runner on a base for example, "1st base to 2nd base" and may include other actions of batters and fielders.

The score input unit 20 may be an application or the like that inputs the score data to the server 30 as electronic data, for example. In this case, the score input unit 20 may be provided in a processing device such as a personal computer provided outside the server 30. Moreover, the score input unit 20 may be provided in the server 30.

The server 30 manages the video management system 100 in an integrated manner. For example, the match video data captured by the camera 10, the score data input by the score input unit 20, the chatting data indicating the content of a chatting corresponding to the match are input to the server 30.

The server 30 manages various items of data including the data input in the above-described manner. Although a personal computer, a workstation, or the like, for example, is used as the server 30, the server 30 is not limited thereto. The detailed configuration of the server 30 will be described later.

The server 30 includes an input/output unit 31, a storage unit 32, and a control unit 33. In the server 30, the input/output unit 31, the storage unit 32, and the control unit 33 are connected via a bus line or the like, for example. The input/output unit 31 is connected to an external device such as the camera 10, the score input unit 20, or the like, for example, and data is input from the camera 10 and the score input unit 20. Moreover, the input/output unit 31 is connected to a communication line (not illustrated). Data is input from the outside to the input/output unit 31 via the communication line. Moreover, the input/output unit 31 outputs data to the outside via the communication line.

Various nonvolatile or volatile memories such as a random access memory (RAM) or a read only memory (ROM), various disks such as a magnetic disk are used as the storage unit 32, for example. The storage unit 32 includes a score data storing unit 51, a chatting data storing unit 52, a video data storing unit 53, a group data storing unit 54, a team data storing unit 55, and a personal data storing unit 56.

The score data storing unit 51 stores the score data input to the server 30. The chatting data storing unit 52 stores chatting data indicating the content of a chatting corresponding to a match, and various application, data, programs, and the like for managing the video management system 100.

FIG. 2 is a diagram illustrating an example of score data stored in the score data storing unit 51. In the example illustrated in FIG. 2, the score data of the bottom of the 8th inning is illustrated. The score data illustrated in FIG. 2 includes batter score data 51a, runner score data 51b, and tag information 51c. The batter score data 51a includes a pitch ID, an at-bat ID, inning information, top/bottom information, batting order information, a personal ID, pitching result information, and on-base information. The score data may include other information such as actions of a fielder.

The video data storing unit 53 stores video data captured by the camera 10. The video data storing unit 53 stores match video data including the affiliation video data as the video data. FIG. 3 is a diagram schematically illustrating an example of the match video data stored in the video data storing unit 53. As illustrated in FIG. 3, the match video data stored in the video data storing unit 53 includes information such as title information 53a, video affiliation information 53b, time information 53c, point information 53d, and synchronization information 53e.

The title information 53a indicates the title of match video data. The video affiliation information 53b indicates the group and the team of an affiliation destination to which the match video data belongs. For example, as illustrated in FIG. 3, the video affiliation information 53b of match video data of which the title information 53a is "video 01" is "team T11". Therefore, the match video data is affiliation video data belonging to the team T11. Moreover, match video data of which the title information 53a is "video 02" is match video data of which the video affiliation information 53b is not set. Match video data or the like that belong to an administrator of the server 30 is an example of the match video data of which the affiliation destination is not set. The match video data that belongs to the administrator of the server 30 may be handled as affiliation video data. Moreover, the video affiliation information 53b of the match video data of which the title information 53a is "video 03" is "team T22". Therefore, the match video data is affiliation video data belonging to the team T22. The time information indicates a reproduction time or the like of the match video data.

The point information 53d indicates the value of a point used as a reward when the affiliation video data is transmitted from the server 30. In the present embodiment, the point is exchanged between each team and the operator of the server 30. Each team can purchase the point from the operator of the server 30. The point can be purchased by each team. Therefore, when a person belonging to a certain team purchases the point, for example, the point is treated as the point of the team. In the present embodiment, although a case in which the value of the point is set for each item of affiliation video data but is not set for match video data different from the affiliation video data is illustrated as an example, the present disclosure is not limited thereto, and the point may be set for match video data different from the affiliation video data.

FIG. 4 is a diagram illustrating an example of the synchronization information 53e. As illustrated in FIG. 4, the synchronization information 53e has tag information 53f and time information 53g. The tag information 53f is information corresponding to the tag information 51c of the score data. The tag information 53f is assigned with a tag number (TA0085, TA0086, . . . ) in ascending order for each tag as an index. The tag information 51c and the tag information 53f are correlated with tags assigned with the same tag number, for example. Moreover, the time information 53g is information correlated with a time point of the match video data stored in the video data storing unit 53. The score data and the time point of the match video data are correlated by the tag information 53f and the time information 53g.

The group data storing unit 54 stores data related to a group. FIG. 5 is a diagram illustrating an example of group data stored in the group data storing unit 54. As illustrated in FIG. 5, the group data includes item information such as group name information 54a of a group registered in advance in the server 30 and affiliation team information 54b. The affiliation team information 54b indicates a team belonging to each group. In this manner, in the group data, each group is correlated with an affiliation team that belongs to the group.

The team data storing unit 55 stores data related to a team belonging to each group. FIG. 6 is a diagram illustrating an example of team data stored in the team data storing unit 55. As illustrated in FIG. 6, the team data includes item information such as a team name information 55a, affiliation group information 55b, and possessing point information 55c of each team. The affiliation group information 55b indicates a group to which each team belongs. Since affiliation group information 55b indicates substantially the same information as the affiliation team information 54b of the group data, either one of them may be omitted. The possessing point information 55c indicates a point possessed by each team. That is, when a certain team purchases the point, the possessing point of the team increases. Moreover, when a certain team consumes the point, the possessing point of the team decreases.

Figures 7, 8:
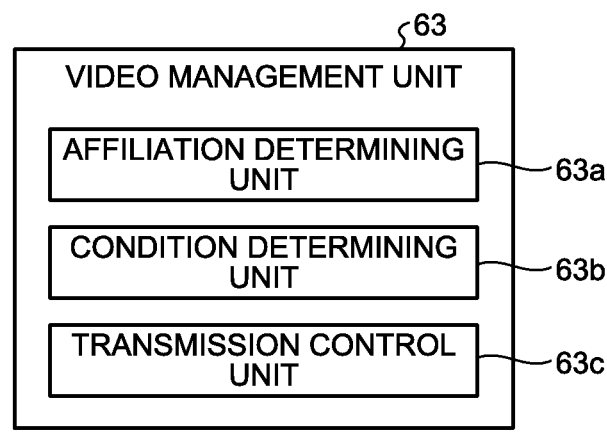
FIG. 7 is a diagram illustrating an example of personal data stored in a personal data storing unit.
FIG. 8 is a block diagram illustrating an example of a video management unit.

The personal data storing unit 56 stores data related to a person belonging to each team. FIG. 7 is a diagram illustrating an example of personal data stored in the personal data storing unit 56. As illustrated in FIG. 7, the personal data includes item information such as personal ID information 56a, affiliation team information 56b, and affiliation group information 56c. The personal data includes data of staffs who support players and teams in addition to data of participants who participate in a match such as players, a manager, coaches, and the like. Moreover, the personal data may include data of advertisers, for example, when advertisements are distributed to the chatting terminal 40 via the server 30, for example.

The storage unit 32 stores a video management program for causing a computer to execute: a process of determining whether, when a server that manages match video data obtained by capturing a match between teams belonging to the same group for respective groups receives a video transmission request to transmit the match video data and affiliation information indicating a group and a team serving as an affiliation destination, transmitted from a terminal, the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group; and a process of transmitting the match video data to a terminal in the first case, transmitting the match video data to the terminal in the second case when a predetermined transmission condition for transmitting the match video data is satisfied, and rejecting transmission of the match video data in the third or second case when the transmission condition is not satisfied.

The control unit 33 has a processing device such as a central processing unit (CPU) and a storage device such as a RAM or a ROM. The control unit 33 has a score management unit 61, a chatting management unit 62, a video management unit 63, and a point management unit 64. The score management unit 61 acquires and manages the score data input by the score input unit 20. The score management unit 61 has a management application for managing the score data. The score management unit 61 transmits the score data input to the server 30, for example, according to the process of the management application. Moreover, when transmitting the score data, the score management unit 61 may include the transmission time data in the score data.

The chatting management unit 62 performs management of a chatting. The chatting management unit 62 has a management application for performing management of a chatting. The chatting management unit 62 transmits the chatting data input to the server 30, for example, according to the process of the management application. The chatting management unit 62 performs management of a plurality of chatting groups. The chatting group is set individually for respective events, matches, or teams, for example. The chatting management unit 62 performs various processes related to a chatting for each chatting group.

The chatting management unit 62 has a chatting generation application for generating chatting data on the basis of the input score data. The chatting management unit 62 generates chatting data on the basis of the input score data according to the process of the chatting generation application and transmits the chatting data. For example, whenever new score data is input, the chatting management unit 62 can generate chatting data that represents the content of the score data using characters or the like. In this way, when score data is updated, users can ascertain the updated score data as chatting information. When transmitting the chatting data, the chatting management unit 62 may include the transmission time data in the chatting data.

The video management unit 63 manages video data input to the server 30. FIG. 8 is a block diagram illustrating an example of the video management unit 63. As illustrated in FIG. 8, the video management unit 63 has an affiliation determining unit 63a, a condition determining unit 63b, and a transmission control unit 63c.

The affiliation determining unit 63a determines whether a video transmission request transmitted from the chatting terminal 40 is received. The video transmission request is a request to transmit the match video data including the affiliation video data from the server 30 to the chatting terminal 40. Moreover, the affiliation determining unit 63a determines whether the affiliation information is received from the chatting terminal 40. The affiliation information is information transmitted simultaneously with the video transmission request from the chatting terminal 40 and is information indicating a group and a team serving as an affiliation destination such as a user of the chatting terminal 40. The affiliation information may be included in a portion of the video transmission request, for example.

Upon receiving the video transmission request and the affiliation information, the affiliation determining unit 63a determines an affiliation destination indicated by the affiliation information. In this case, the affiliation determining unit 63a determines whether the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group.

When the affiliation determining unit 63a determines that the video transmission request and the affiliation information correspond to the second case, the condition determining unit 63b determines whether a predetermined transmission condition for transmitting the affiliation video data from the server 30 to the chatting terminal 40 is satisfied. In the present embodiment, the transmission condition is to grant a point from a team of the affiliation destination indicated by the affiliation information to the server 30. In this case, the value of the point granted from the team to the server 30 is a value set as the point information of the affiliation video data stored in the video data storing unit 53. Therefore, the condition determining unit 63b determines that the transmission condition is satisfied when the point is granted from the team to the server 30. Moreover, the condition determining unit 63b determines that the transmission condition is not satisfied when the point is not granted from the team to the server 30.

In the first case, the transmission control unit 63c transmits the affiliation video data from the server 30 to the chatting terminal 40. Moreover, in the second case, when the transmission condition is satisfied, the transmission control unit 63c transmits the affiliation video data from the server 30 to the chatting terminal 40. On the other hand, in the second case, when the transmission condition is not satisfied, the transmission control unit 63c rejects transmission of the affiliation video data. In the third case, the transmission control unit 63c rejects transmission of the affiliation video data.

The point management unit 64 performs management of the point. The point management unit 64 performs a process related to purchase of a point according to a point purchase request from the user or the like of the chatting terminal 40. The point purchase request is transmitted from the chatting terminal 40 to the server 30 and includes information on a purchasing team and information on a purchasing point value, for example.

The point management unit 64 has a purchase application for performing a process related to purchase of a point. When the server 30 receives a point purchase request from the chatting terminal 40, the point management unit 64 performs a process related to purchase of a point according to the process of the purchase application. For example, the point management unit 64 presents an amount of money corresponding to a point value that is based on the point purchase request from the chatting terminal 40, prompts the chatting terminal 40 to input a card number or the like of a credit card and to input a decision to settle a payment to thereby perform a payment process. When the payment process is completed, the point management unit 64 adds the purchased point to the possessing point (see FIG. 6) of the team to which the purchaser belongs.

The point management unit 64 performs a process related to the use of a point. The point management unit 64 has a use application for performing a process related to the use of a point. A point use request is transmitted from the chatting terminal 40 to the server 30 and includes information on a team for which a point is used and information on a point value to be used, for example. In the second case, for example, the point management unit 64 transmits a guidance from the server 30 to the chatting terminal 40 so as to guide the chatting terminal 40 to use a point value necessary for satisfying the transmission condition. The point use request includes a request corresponding to the guidance.

When the server 30 receives the point use request from the chatting terminal 40, the point management unit 64 performs a process related to the use of a point according to the process of the use application. For example, the point management unit 64 compares the point value that is based on the point use request with the possessing point of the team stored in the team data storing unit 55. When the possessing point value is equal to or larger than the point value that is based on the point use request, a point using process is performed. That is, a process of deducting a point value that is based on the point use request from the possessing point value stored in the team data storing unit 55 is performed. When the possessing point value is smaller than the point value that is based on the point use request, the point management unit 64 rejects the use of a point.

The point management unit 64 sets reward point information (see FIG. 3 and the like) necessary for transmitting the affiliation video data to the server 30. The point management unit 64 sets the reward point value for each item of affiliation video data. The point management unit 64 can set the reward point value on the basis of the past score data of the team serving as the affiliation destination of the affiliation video data, for example. In this case, the reward point value can be set such that the higher the winning rate of the match of the affiliation destination team, the higher the reward point value, for example.

The chatting terminal 40 includes an input unit 41, a display unit 42, a communication unit 43, a storage unit 44, and a control unit 45. The input unit 41, the display unit 42, the communication unit 43, the storage unit 44, and the control unit 45 are connected via a bus line or the like, for example. A portable information terminal such as a cellular phone, a smartphone, a tablet, or a laptop-type personal computer can be used as an example of the chatting terminal 40.

The input unit 41 can be used to perform a predetermined input operation for inputting information. The input unit 41 outputs an instruction signal to the control unit 45 according to the input operation. Moreover, the input unit 41 can be used to input information corresponding to the video transmission request, the point purchase request, and the point use request. An input device such as a touch panel, for example, is used as the input unit 41. Buttons, a lever, a dial, a switch, or other input devices may be used as the input unit 41 in addition to the touch panel or instead of the touch panel. The input unit 41 outputs an instruction signal corresponding to a predetermined input operation. The display unit 42 displays various images including characters and images. The display unit 42 has a display panel such as a liquid crystal panel. The display unit 42 can display information including a video.

Figure 9:
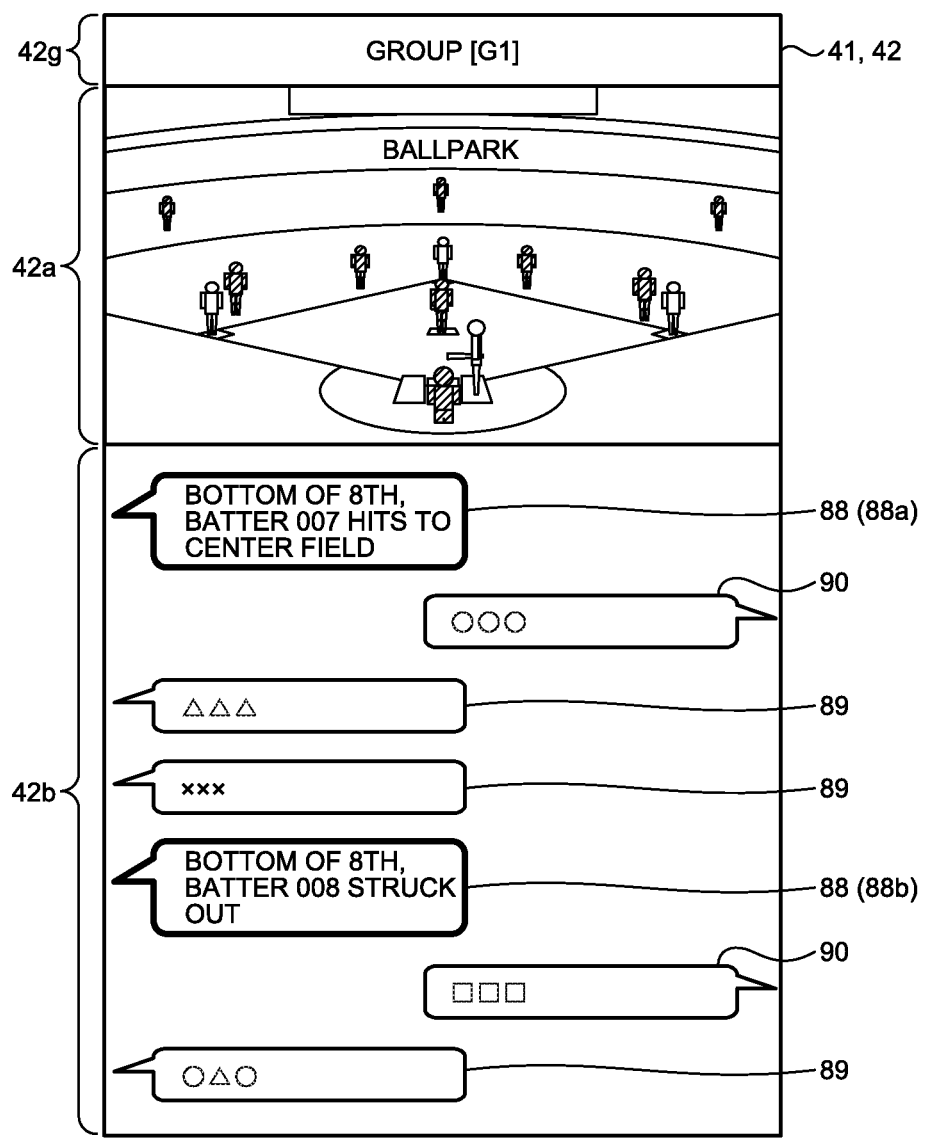
FIG. 9 is a diagram illustrating an example of an input unit and a display unit of a chatting terminal according to the present embodiment.

FIG. 9 is a diagram illustrating an example of the input unit 41 and the display unit 42 of the chatting terminal 40 according to the present embodiment. As illustrated in FIG. 9, the chatting terminal 40 has a touch panel-type input unit 41 and a touch panel-type display unit 42, for example. That is, a touch panel which is the input unit 41 is superimposed on a display panel which is the display unit 42.

A video display region 42*a*, a chatting display region 42*b*, and a group display region 42*g*, for example, are displayed on the display unit 42. Video data is displayed in the video display region 42*a*.

Chatting data is displayed in the chatting display region 42*b*. For example, a server message 88 which is chatting data generated by the server 30, a third-party message 89 which is chatting data input by another chatting terminal 40 different from the chatting terminal 40, a user's message 90 which is chatting data input by the chatting terminal 40, and the like are displayed in the chatting display region 42*b*. The server message 88 is a message that represents the content of the score data input to the server 30 using characters, for example. A server message 88*a* on an upper side in FIG. 9 is a content indicating that a batter 007 hits to center field on the bottom of the 8th inning. Moreover, a server message 88*b* on a lower side in FIG. 9 is a content indicating that a batter 008 gets struck out on the bottom of the 8th inning.

The server message 88 and the third-party message 89 are displayed in a left-side region of the chatting display region 42*b*, for example. Moreover, the user's message 90 is displayed on a right-side region of the chatting display region 42*b*, for example. Moreover, the server message 88 and the third-party message 89 may be displayed in a distinguished manner so that the messages are displayed in figures with different border types. In this way, the server message 88 and the third-party message 89 can be distinguished from each other. Information on a group to which an operator of the chatting terminal 40 belongs is displayed in the group display region 42*g*.

The input unit 41 outputs a predetermined instruction signal including position information of a region on which an operation is input and an operation content when a user performs an operation such as a touch operation or a scroll operation on a predetermined region on the surface of a touch panel. The position information is set so as to correspond to the position of the display unit 42, for example. The configuration of the input unit 41 and the display unit 42 is not limited to the above-described configuration.

The communication unit 43 interacts information with an external device by wired or wireless communication. The communication unit 43 transmits and receives chatting data, score data, video data, and the like to and from an external server 30, for example.

The storage unit 44 has a storage such as a hard disk drive or a solid state drive, for example. An external storage medium such as a removable disc may be used as the storage unit 44. The storage unit 44 stores an operating system of the chatting terminal 40, various programs for controlling the operation of the input unit 41, the display unit 42, and the communication unit 43, a chatting application for performing a chatting, various programs, data, and the like.

The control unit 45 controls the respective units of the input unit 41, the display unit 42, and the communication unit 43. Moreover, the control unit 45 performs an arithmetic operation, a process, and the like according to an instruction signal input by the input unit 41. The control unit 45 has a processing device such as a CPU and a storage device such as a RAM or a ROM.

Figure 10:
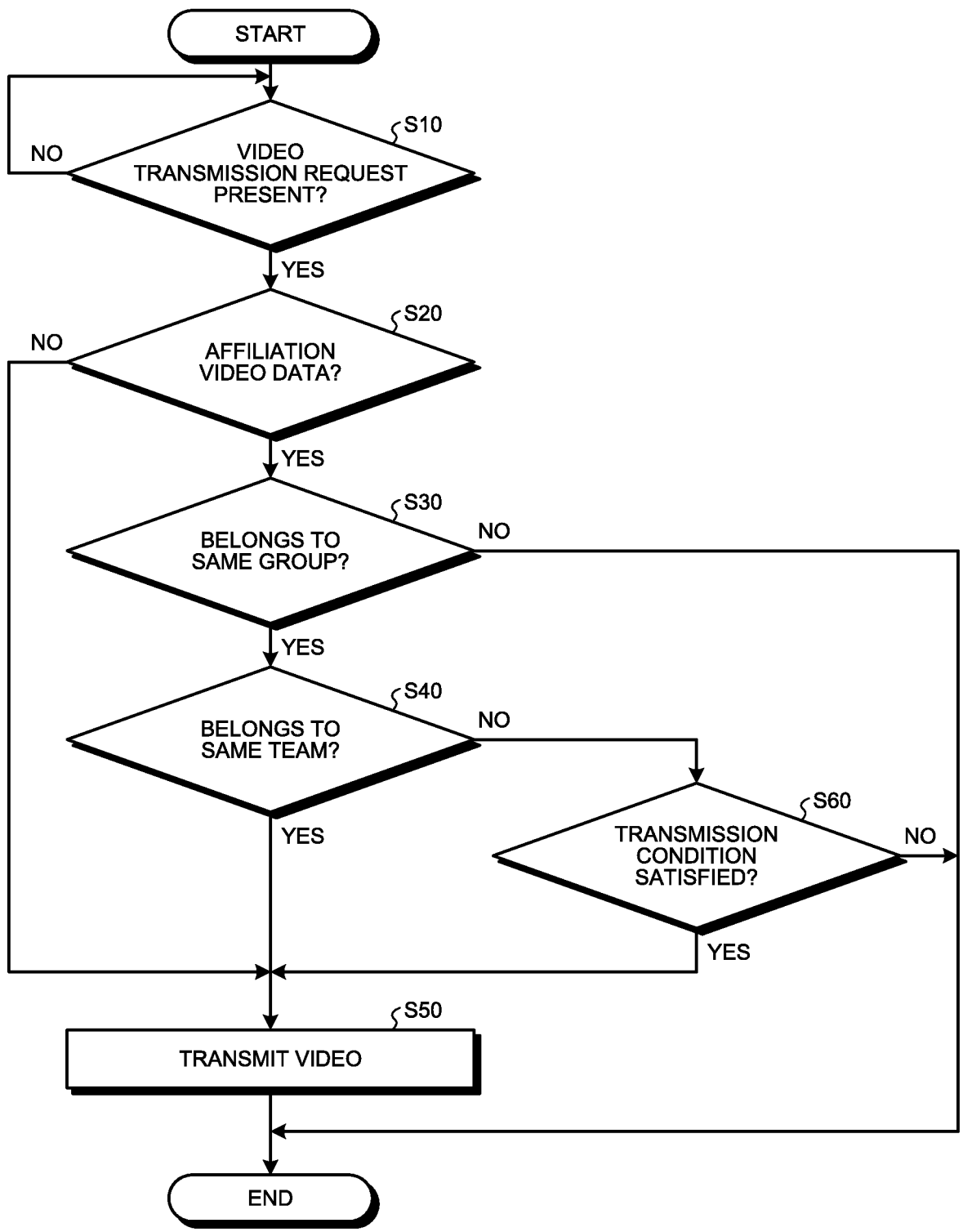
FIG. 10 is a flowchart illustrating an example of an operation of a video management system according to the present embodiment.

Next, the operation of the video management system 100 having the above-described configuration will be described. FIG. 10 is a flowchart illustrating an example of the operation of the video management system 100 according to the present embodiment. FIG. 10 illustrates an example of a video management method according to the present embodiment.

With the progress of a match, score data is input from the score input unit 20 to the input/output unit 31 of the server 30. In this case, the score management unit 61 acquires the score data and stores the same in the score data storing unit 51. Moreover, the chatting management unit 62 generates the chatting data on the basis of the score data and transmits the generated chatting data to the chatting terminal 40 while storing the same in the chatting data storing unit 52. Furthermore, when the chatting data is transmitted from the chatting terminal 40 to the server 30, the transmitted chatting data is input to the input/output unit 31. In this case, the chatting management unit 62 stores the chatting data in the chatting data storing unit 52.

The video management unit 63 determines whether the video transmission request is received from the chatting terminal 40 (Step S10). When it is determined that the video transmission request is not received (No in Step S10), the video management unit 63 repeatedly performs the process of Step S10. When it is determined that the video transmission request is received (Yes in Step S10), the video management unit 63 determines whether match video data serving as the target of the video transmission request is affiliation video data (Step S20).

When the match video data serving as the target of the video transmission request is not the affiliation video data (No in Step S20), the target match video data is transmitted from the server 30 to the chatting terminal 40 (Step S50). Moreover, when the match video data serving as the target of the video transmission request is the affiliation video data (Yes in Step S20), the video management unit 63 makes the following determination with respect to the relationship between the affiliation destination indicated by the affiliation information and the affiliation destination of the affiliation video data on the basis of the affiliation information transmitted together with the video transmission request. The following determination order is an example and determination may be made in different order.

In the present embodiment, first, the video management unit 63 determines whether the group of the affiliation destination indicated by the affiliation information and the group of the affiliation destination of the affiliation video data are the same (Step S30). When it is determined in Step S30 that the group of the affiliation destination indicated by the affiliation information and the group of the affiliation destination of the affiliation video data are not the same (third case, No in Step S30), the video management unit 63 rejects transmission of the affiliation video data and ends the process.

When it is determined in Step S30 that the group of the affiliation destination indicated by the affiliation information and the group of the affiliation destination of the affiliation video data are the same (Yes in Step S30), the video management unit 63 determines whether the team of the affiliation destination indicated by the affiliation information and the team of the affiliation destination of the affiliation video data are the same (Step S40).

When it is determined in Step S40 that the team of the affiliation destination indicated by the affiliation information and the team of the affiliation destination of the affiliation video data are the same (first case, Yes in Step S40), the video management unit 63 transmits the affiliation video data from the server 30 to the chatting terminal 40 (Step S50).

When it is determined in Step S40 that the team of the affiliation destination indicated by the affiliation information and the team of the affiliation destination of the affiliation video data are not the same (second case, No in Step S40), the video management unit 63 determines whether a predetermined transmission condition for transmitting the affiliation video data to the chatting terminal 40 is satisfied (Step S60). When making the determination of Step S60, the point management unit 64 transmits a guidance from the server 30 to the chatting terminal 40 so as to guide the chatting terminal 40 to use a point value necessary for satisfying the transmission condition.

When the server 30 receives a point use request to use a point value, the point management unit 64 compares the point value that is based on the point use request and the possessing point of the team stored in the team data storing unit 55. When the possessing point value is equal to or larger than the point value that is based on the point use request, the point management unit 64 performs a process of deducting the point value that is based on the point use request from the value of the possessing point stored in the team data storing unit 55. When the possessing point value is smaller than the point value that is based on the point use request, the point management unit 64 rejects the use of a point.

FIG. 11 is a diagram illustrating an example of a case in which the point information of the team data changes. In FIG. 11, a case in which the team that requests transmission of affiliation video data is "T11" and the affiliation destination team of the affiliation video data is "T12" will be described as an example. Hereinafter, a team having the team name of "T11" will be referred to as team T11 and a team having the team name of "T12" will be referred to as team T12.

When a point of a point value α is granted from team T11, for example, as illustrated in FIG. 11, the point management unit 64 deducts the granted point value α from the point value P11 indicated by the possessing point in the team data of team T11. In this way, the use of the point of the point value α by team T11 is applied.

When it is determined in Step S60 that the predetermined transmission condition is satisfied (Yes in Step S60), the video management unit 63 transmits the affiliation video data from the server 30 to the chatting terminal 40 (Step S50). When it is determined in Step S60 that the predetermined transmission condition is not satisfied (No in Step S60), the video management unit 63 rejects transmission of the affiliation video data and ends the process.

As described above, the video management system 100 according to the present embodiment includes: the server 30 that manages match video data obtained by capturing a match between teams belonging to the same group for respective groups; and the chatting terminal 40 configured to be able to transmit a video transmission request to transmit the match video data and affiliation information indicating a group and a team serving as an affiliation destination to the server 30 and configured to be able to receive the match video data transmitted from the server 30, in which the match video data managed by the server 30 includes affiliation video data affiliated to a specific team, the server 30 includes: the control unit 33 that, upon receiving the video transmission request and the affiliation information transmitted from the chatting terminal 40, determines whether the video transmission request and the affiliation information correspond to a first case in which the affiliation destination indicated by the affiliation information and the affiliation destination of the affiliation video data are the same, a second case in which the affiliation destination indicated by the affiliation information and the affiliation destination of the affiliation video data are the same for a group and are different for a team, or a third case in which the affiliation destination indicated by the affiliation information and the affiliation destination of the affiliation video data are different for a group, the control unit 33 transmitting the match video data to the chatting terminal 40 in the first case, transmitting the match video data to the chatting terminal 40 in the second case when a predetermined transmission condition for transmitting the match video data is satisfied, and rejecting transmission of the match video data in the third case or the second case when the transmission condition is not satisfied.

In this way, it is possible to effectively utilize the affiliation video data by allowing members of teams different from the affiliation destination team of the affiliation video data to watch the affiliation video data while suppressing the affiliation video data from being distributed unlimitedly.

In the video management system 100 according to the present embodiment, the server 30 manages a point used as a reward for transmitting the affiliation video data for respective teams, and the transmission condition is to grant a point from the affiliation destination indicated by the affiliation information to the server 30. In this way, it is possible to prevent the affiliation video data from being distributed unlimitedly.

In the video management system 100 according to the present embodiment, the server 30 sets a value of a point granted from the affiliation destination indicated by the affiliation information to the affiliation destination of the affiliation video data on the basis of the match progress data indicating the progress state of past matches of the affiliation destination of the affiliation video data. For example, the demand for the affiliation video data of the team of the affiliation destination of the affiliation video data is likely to increase in order to analyze the affiliation video data of the team when the winning rate of the past matches of the affiliation destination team of the affiliation video data is high. Therefore, in this case, the value of the point can be set according to the demand. In this manner, by using the past match progress data of the affiliation destination of the affiliation video data, the match video data can be utilized in a wide range of utilization forms.

In the video management system 100 according to the present embodiment, the server 30 manages the match video data and the score data indicating the progress state of a match in correlation. In this way, it is possible to watch the match video data corresponding to the score data. The server 30 may store the match video data including the affiliation video data by breaking the same for respective items of score data and may transmit the match video data for each item of score data according to the video transmission request.

A technical scope of the present disclosure is not limited to the above-described embodiment but may be changed appropriately without departing from the spirit of the present disclosure. For example, in the above-described embodiment, although a case in which a point is granted from a team indicated by the affiliation information to the server 30 in the second case has been described as an example, the present disclosure is not limited thereto.

FIG. 12 is a diagram illustrating another example of a case in which the point information of the team data changes. In FIG. 12, a case in which the team that requests transmission of affiliation video data is "T11" and the affiliation destination team of the affiliation video data is "T12" will be described as an example similarly to the case illustrated in FIG. 11. Hereinafter, a team having the team name of "T11" will be referred to as team T11 and a team having the team name of "T12" will be referred to as team T12.

When a point is granted from team T11, the point management unit 64 deducts the granted point value $\alpha$ from the point value P11 indicated by the possessing point in the team data of team T11. After that, the point management unit 64 adds at least a partial point value $\beta$ of the deducted point value $\alpha$ to the point value P12 indicated by the possessing point of the team data of team T12 ($\alpha \geq \beta$). When the point value $\alpha$ is larger than the point value $\beta$ ($\alpha > \beta$), a difference between the point value $\alpha$ and the point value $\beta$ can be paid for a maintenance fee or the like of an administrator of the server 30, for example. The point management unit 64 may add a larger point value than the deducted point value $\alpha$ to the point value P12 of the team data of team T12.

By doing so, at least a portion of the point granted from team T11 who requested transmission of the affiliation video data to the server 30 can be granted to team T12 which is the affiliation destination of the affiliation video data. In this manner, since a benefit is granted to team T12 that provides the affiliation video data, it is possible to effectively utilize the match video data. Moreover, the point granted to team T12 can be used when transmitting the affiliation video data of another team different from team T12. Therefore, it is possible to exchange points between teams via the server 30.

In the above-described embodiment, although a case in which the point is used as a reward for transmitting the affiliation video data to the server 30 has been described as an example, the present disclosure is not limited thereto. For example, the server 30 may manage an application that can be installed in the chatting terminal 40 and the chatting terminal 40 may be able to transmit an application transmission request to the server 30 to transmit the application. In this case, upon receiving an application transmission request from the chatting terminal 40, the server 30 may transmit the application to the chatting terminal 40 on condition that a point is granted to the server 30. With this configuration, it is possible to effectively utilize the points. The use of the points is not limited thereto. For example, when an advertisement is distributed to the chatting terminal 40 via the server 30, the points may be used for purchasing a product sold by an advertiser or use a service provided by the advertiser.

In the above-described embodiment, although a case in which a person belonging to a team purchases a point when the point is purchased for each team has been described as an example, the present disclosure is not limited thereto. For example, a third party who does not belong to a team may be allowed to purchase the point in order to grant the point to a specific team to cheer for the team, for example. Moreover, when an advertisement is distributed to the chatting terminal 40 via the server 30, a point may be granted from an advertiser to each team under the name of an advertising rate or the like at arbitrary timings or regularly. Furthermore, an advertiser may purchase points from the server 30 at arbitrary timings or regularly and distribute the points from the server 30 to each team.

In the above-described embodiment, although the chatting terminal 40 has been described as an example of a terminal, the terminal is not limited thereto but may be a terminal that does not perform a chatting.

According to the present disclosure, it is possible to effectively utilize the match video.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video management system comprising:
a server that manages match video data by a group, the match video data being obtained by capturing a match of a team, the team belonging to the group; and
a terminal configured to be able to transmit a video transmission request and affiliation information to the server, video transmission request to transmit the match video data, the affiliation information indicating the group and serving as an affiliation destination, and configured to be able to receive the match video data transmitted from the server, wherein
the match video data managed by the server includes affiliation video data belonging to a specific team, and
the server includes a controller, the controller being configured to:
upon receiving the video transmission request and the affiliation information transmitted from the terminal, determine the video transmission request and the affiliation information correspond to a first case in which the affiliation destination indicated by the affiliation information and the affiliation destination of the affiliation video data are same, a second case in which the affiliation destination indicated by the affiliation information and the affiliation destination of the affiliation video data are same for the group and are different for the team, or a third case in which the affiliation destination indicated by the affiliation information and the affiliation destination of the affiliation video data are different for the group,
in the first case, transmit the match video data to the terminal,
in the second case, transmit the match video data to the terminal when a predetermined transmission condition for transmitting the match video data is satisfied, and
in the third case, reject transmission of the match video data when the transmission condition is not satisfied or reject transmission of the match video data in the second case when the transmission condition is not satisfied.

2. The video management system according to claim 1, wherein
the server manages a point used as a reward for transmitting the affiliation video data for each team of a plurality of teams, and
the transmission condition is to grant the point from an affiliation destination indicated by the affiliation information to the server.

3. The video management system according to claim 2, wherein
the server grants at least a portion of the granted point to the affiliation destination of the affiliation video data when the point is granted from the affiliation destination indicated by the affiliation information.

4. The video management system according to claim 2, wherein
the server sets a value of the point granted from the affiliation destination indicated by the affiliation information to the affiliation destination of the affiliation video data on the basis of match progress data indicating a progress state of the past matches of the affiliation destination of the affiliation video data.

5. A video management method comprising:
managing, at a server, match video data by a group, the match video data being obtained by capturing a match of a team, the team belonging to the group;
receiving, at the server, a video transmission request and affiliation information both transmitted from a terminal, the video transmission request being to request the server to transmit the match video data, the affiliation information indicating the group and the team serving as an affiliation destination;
determining, at the server, the video transmission request and the affiliation information correspond to a first case in which the affiliation destination indicated by the affiliation information and the affiliation destination of the affiliation video data are same, a second case in which the affiliation destination indicated by the affiliation information and the affiliation destination of the affiliation video data are same for the group and are different for the team, or a third case in which the affiliation destination indicated by the affiliation information and the affiliation destination of the affiliation video data are different for the group; and
in the first case, transmitting the match video data to the terminal,
in the second case, transmitting the match video data to the terminal in response to a predetermined transmission condition for transmitting the match video data being satisfied, and
in the third case, rejecting transmission of the match video data in response to the transmission condition being not satisfied or rejecting transmission of the match video data in the second case in response to the transmission condition being not satisfied.

6. A non-transitory computer readable recording medium storing therein a video management program that is executed by a computer to:
manage, at a server, match video data by a group, the match video data being obtained by capturing a match of a team, the team belonging to the group;
receive, at the server, a video transmission request and affiliation information both transmitted from a terminal, the video transmission request being to transmit the match video data, the affiliation information indicating the group and the team serving as an affiliation destination;
determine, at the server, the video transmission request and the affiliation information correspond to a first case in which the affiliation destination indicated by the affiliation information and the affiliation destination of the affiliation video data are same, a second case in which the affiliation destination indicated by the affiliation information and the affiliation destination of the affiliation video data are same for the group and are different for the team, or a third case in which the affiliation destination indicated by the affiliation information and the affiliation destination of the affiliation video data are different for the group; and in the first case, transmitting the match video data to the terminal, in the second case, transmitting the match video data to the terminal in response to a predetermined transmission condition for transmitting the match video data being satisfied, and in the third case, rejecting transmission of the match video data in response to the transmission condition being not satisfied or rejecting transmission of the match video data in the second case in response to the transmission condition being not satisfied.

* * * * *